(No Model.)  5 Sheets—Sheet 2.

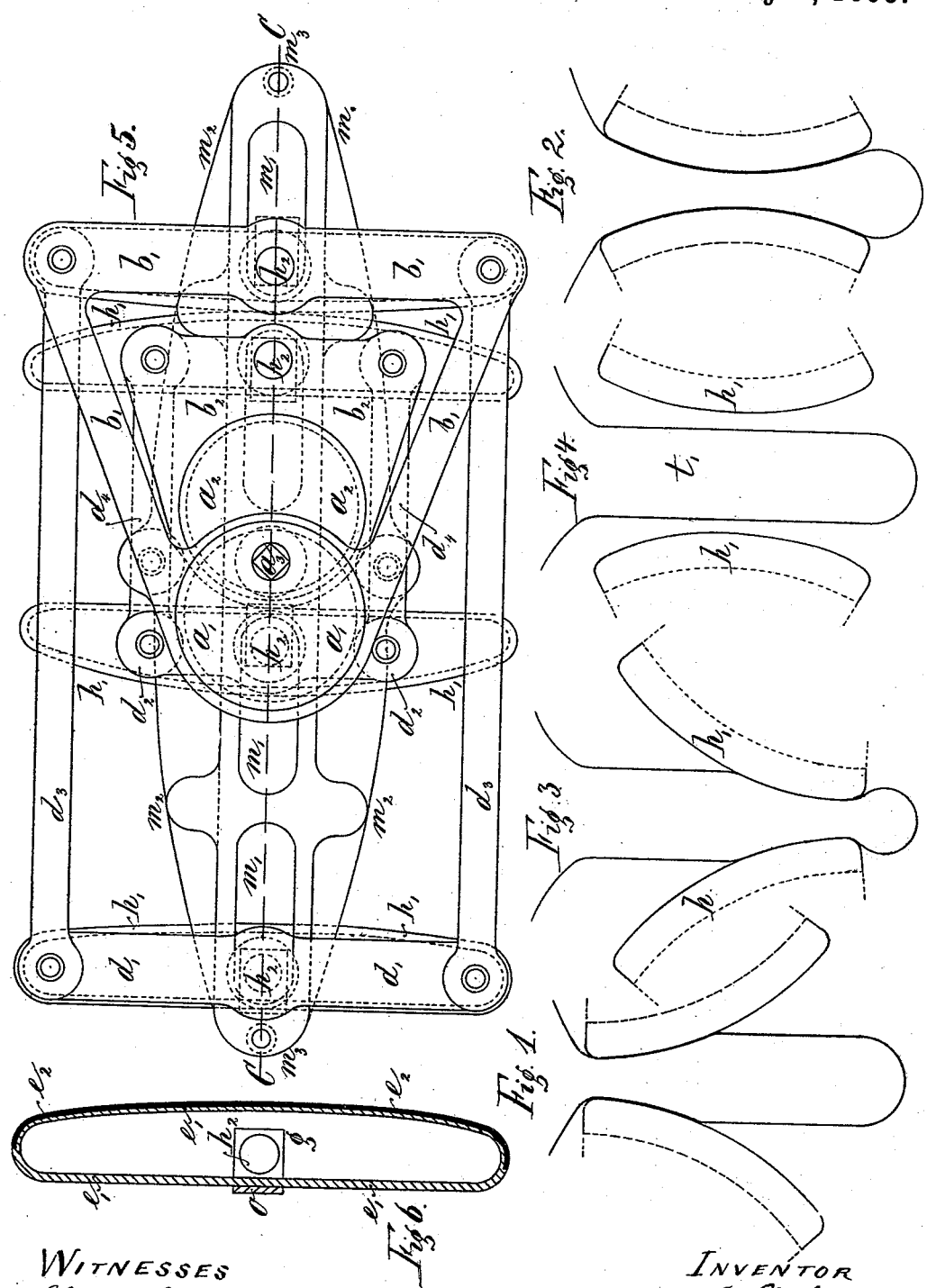

J. NIELSEN.
COW MILKER.

No. 496,581.  Patented May 2, 1893.

WITNESSES:
Charles Schroeder.
William Duhm

INVENTOR
J. Nielsen.
by Goepel & Raegener
ATTORNEYS.

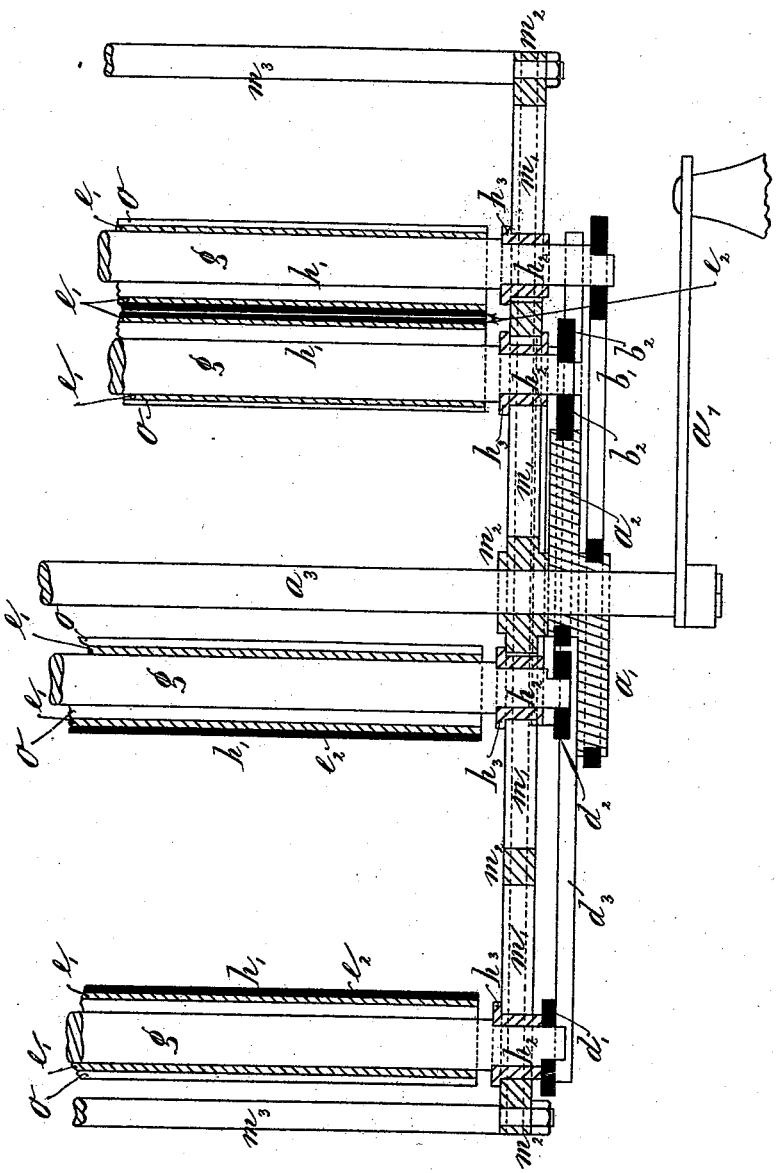

(No Model.) 5 Sheets—Sheet 4.

J. NIELSEN.
COW MILKER.

No. 496,581. Patented May 2, 1893.

WITNESSES
Charles Schroeder.
Charles Bles

INVENTOR
J. Nielsen
by Jacque & Jaegeur
ATTORNEYS.

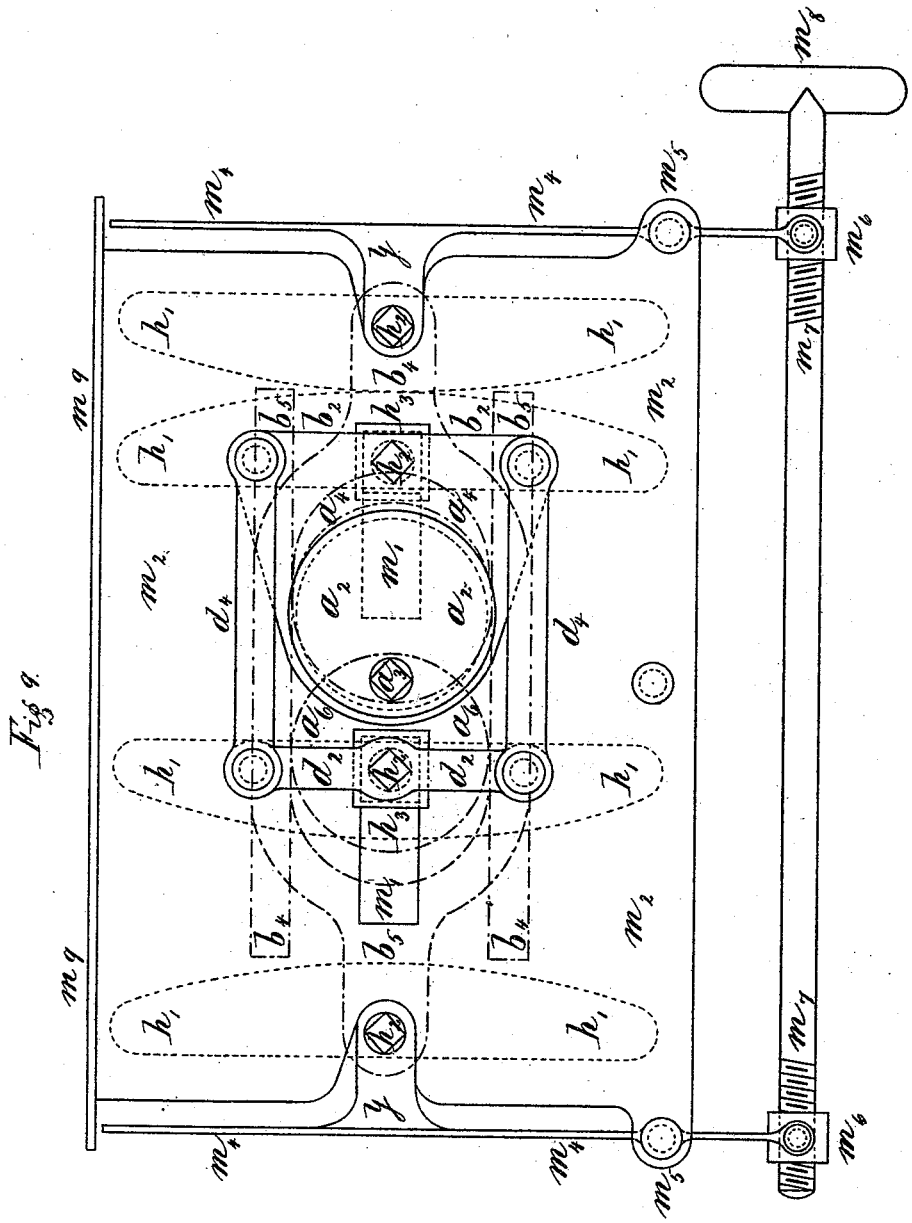

UNITED STATES PATENT OFFICE.

JENS NIELSEN, OF COPENHAGEN, DENMARK.

COW-MILKER.

SPECIFICATION forming part of Letters Patent No. 496,581, dated May 2, 1893.

Application filed December 1, 1891. Serial No. 413,644. (No model.)

*To all whom it may concern:*

Be it known that I, JENS NIELSEN, manufacturer, a citizen of Denmark, residing at Copenhagen, Denmark, have invented certain new and useful Improvements in a Cow-Milking Apparatus, of which the following is a specification.

This invention relates to improvements in cow-milking apparatus, and the object of my invention is to provide an apparatus of this kind which is simple in construction, effective in operation and which does not act injuriously upon the teats of the cow.

The invention consists in the combination with a frame of rocking and reciprocating pads in the same, and mechanism for operating said pads, which mechanism consists of eccentric disks on a main shaft and means for transmitting motion from said eccentric disks to the pads.

The invention also consists in the construction and combination of parts and details which will be fully described hereinafter and finally pointed out in the claims.

Figure 4A:
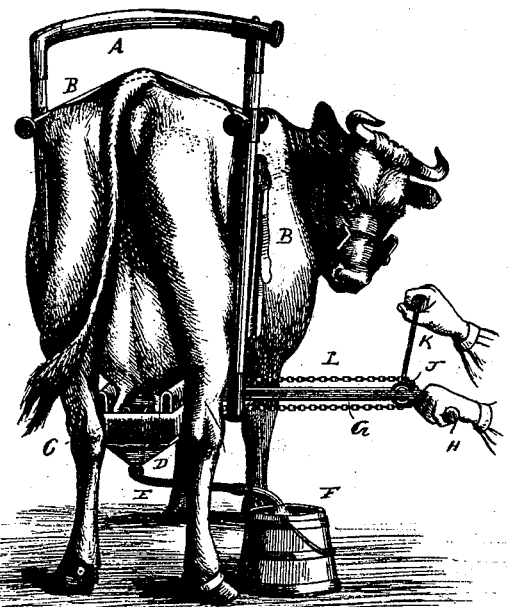
Figures 8, 10:
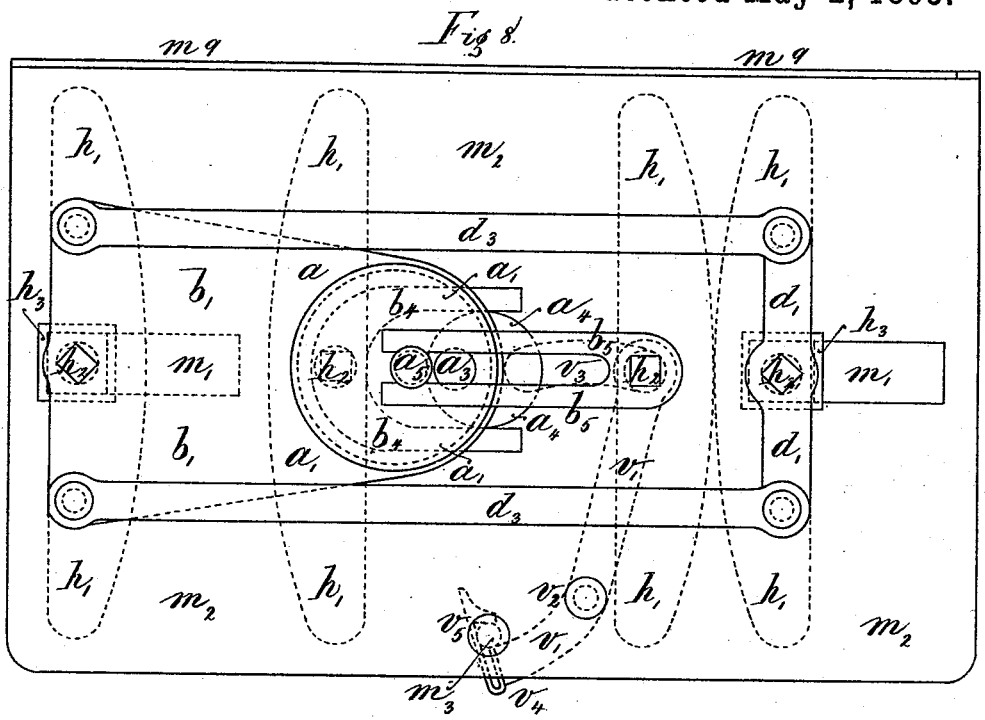

In the accompanying drawings, Figures 1 to 4 are diagrammatic views showing the different positions of the pressing and milking pads in relation to the teats. Fig. 4$^a$ shows the apparatus as applied on a cow, and in use. Fig. 5 is an end-elevation of the milking apparatus. Fig. 6 is a detail vertical-sectional view of one of the pads. Fig. 7 is a sectional plan-view of the milking-machine on the line C C of Fig. 5. Fig. 8 is an end-view of a modified construction. Fig. 9 is an end-view of a further modification. Fig. 10 is a plan-view of the top or covering plate.

Similar letters of reference indicate corresponding parts.

Fig. 1 shows the positions of the pads at the beginning of the milking-operation on one teat $t$, in which position the upper ends of the pads $h'$ compress the teat at its upper end; they then rock and roll down along the teat, as shown in Figs. 2 and 3, the teat constantly remaining compressed between said two pads, so as to force out the milk. Toward the end of the milking operation the lower ends of the pads compress the lower part of the teat, as shown in Fig. 3, and are then separated from each other and from the teat, as shown in Fig. 4.

Figs. 5 and 6 show a milking apparatus with two pairs of rocking and reciprocating pads. As both end-parts of the machine are alike; only half of the machine has been shown in Fig. 7.

The shaft $a^3$, provided with a crank-handle $a^7$ is mounted to turn in said pieces $m^2$ of the frame, and is connected in a manner that will be described hereinafter with the pressing-pads $h'$, which are each provided with two end-pivots $h^2$, that are mounted in sliding-boxes $h^3$, which boxes are guided in the longitudinal slots $m'$ of the end-pieces $m^2$ of the frame. Said end-pieces $m^2$ of the frame are connected at their ends by the rods $m^3$, which rods $m^3$ and end-pieces $m^2$ form the frame of the apparatus. On each end-pivot of one pair of pads at one side of the machine the eccentric frames $b'$ $b^2$ are keyed or fastened in any suitable manner, and said eccentric frames surround the eccentric disks $a'$ and $a^2$ fixed on the shaft $a^3$. As both ends of the machine are constructed alike, each pad will be connected with two eccentric frames, one at each end of the machine, and the corresponding disks must be provided on each end of the shaft $a^3$. The two eccentric disks $a'$ and $a^2$ on the same end of the shaft $a^3$ are fixed in relation to each other at an angle of one hundred and eighty degrees, and the eccentrics at both ends of the shaft $a^3$ are arranged in the same manner, so that when the shaft $a^3$ is rotated the pads $h'$ of each pair are alternately moved toward and from each other, and at the same time the rocking motion necessary for milking is imparted to the same.

In case the machine is provided with two pairs of milking pads, as shown in Figs. 5 and 7, only one pair is connected with the eccentric frames, whereas the other pair of pads is provided on each end-pivot with fixed transverse arms $d'$ or $d^2$, which arms are connected by means of the pivoted connecting-rods $d^3$ and $d^4$ with the corresponding eccentric-pieces of the first pair of pads, which eccentric-frames for this reason have an approximately angular shape so that the connecting-rods $d^3$ and $d^4$ with the eccentric-frames and the arms $d'$ and $d^2$ form parallelograms, by which the pads of one pair approach each other while the pads of the other pair are being drawn from each other, and so that one pair of pads acts on the teats, while the other is being moved from the teats. The pads themselves are made elastic, and as shown in Fig. 6 consist of a bent elastic metal plate $e'$, which by means of a flat bar $o$ and suitable fastening devices is attached to a bar $g$, within the hollow pad, on the ends of which bar $g$ the end-pivots $h^2$ for the pads are formed. The rounded, convex outer surface of each pad is provided with a covering layer $e^2$ of rubber.

Fig. 8 shows a machine similar to the one shown in Figs. 5 and 7, but in this construction only the outer pad of each pair is mounted to reciprocate and to be rocked, whereas the inner pad of each pair is only rocked during the milking-operation. The outer pads of each pair are operated by the same means as shown in Figs. 5 and 7, that is, the eccentrics $a'$ on the shaft $a^3$, the eccentric-frames $b'$, the arms $d^3$, &c. The shaft $a^3$ also carries on it an eccentric-disk $a^4$ and a forked piece $b^4$ is fastened to the end-pivot $h^2$ of one inner pad, said end-pivots of the said inner pad being mounted in openings of the end-pieces $m^2$ of the frame. The shanks of the forked-piece $b^4$ embrace the eccentric-piece $a^4$, as shown in Fig. 8. The forked-piece $b^5$ is fixed on the end-pivot $h^2$ of the inner pad and embraces a crank-pin $a^5$ projecting from the eccentric-disk $a'$. The crank-pin $a^5$ and the eccentric-disk $a^4$ are arranged in relation to each other at an angle of one hundred and eighty degrees, and are also so arranged and located that the corresponding segments always remain parallel during the rocking movement, so that the segments can easily be separated so as to introduce the teats; the end-pivots of one of the inner pads is mounted in the end lever $v'$, mounted on the pivots $v^2$ on the inner surfaces of the end-pieces $m^2$ of the frame, the said end-pivots being adapted to move in the curved slots $v^3$ in the end-pieces $m^2$, one of which curved slots is shown in dotted lines in Fig. 8. The lower ends of the levers $v'$ are connected by a cross piece $v^4$, which is provided with a spring-catch $v^5$ that can engage the cross-pin $m^3$ of the frame after the pad has been adjusted. In order to give the said pad a greater space to move in, the inner pads of each pair are arranged as close as possible to the shaft $a^3$. When the teats are to be introduced between the pads, the crank is turned so as to bring the pads into position as shown in dotted lines, Fig. 8. The spring-catch $v^5$ is disengaged from the cross-bar $m^3$ and the pad connected with the levers $v'$ is moved toward the shaft $a^3$ so as to permit of introducing the teat.

Fig. 9 shows a further modification, in which only one pad of each pair is reciprocated and rocked and the other pad of each pair is only rocked, but in this construction the inner pads reciprocate and rock and the outer pads rock only. The inner pads of each pair are operated in the same manner, as shown in Figs. 5 and 6, and for this reason the parts have been designated by the same letters. The outer pads are rocked by means of the two eccentrics $a^4$ and $a^6$ on the shaft $a^3$ and the two forked pieces embrace the eccentrics $a^4$ and $a^6$ and are fastened on the end-pivots of the outer pads. The eccentrics and the forks can be arranged at one or both sides of the machine, and so as not to confuse the drawings they have been shown in dotted lines. As the forks are worked the same as those shown in the construction in Fig. 8, the same letters of reference have been used. The inner pads are operated by the eccentric $a^2$ and frame $b^2$. For the purpose of moving the pads from each other when the teats are to be introduced, the outer pads have their end pivots $h^2$ mounted in the arms $y$ at pivoted arms $m^4$, which fit into corresponding notches in the end-pieces. Said arms $m^4$ are mounted to turn on the pivots $m^5$, between the end-pieces and are provided with downward extensions carrying the pivoted nuts $m^6$, into which the right and left hand threaded parts $m^7$ of a spindle $m^4$ are screwed, said spindle having a handle $m^8$ for turning it. By turning the spindle, the said levers $m^4$ can be swung from each other, and after the teats have been introduced can be moved back into position shown in full lines in Fig. 9 by reversing the direction of rotation of the spindle. According as more or less pressure is required to press the teats, the pads must be adjusted accordingly, so that during their movements they approach each other very closely, or a greater or less distance remains between them. In each construction shown the mechanism for rocking one pad of each pair can be omitted and the segment that is not rocked can then be replaced by a flat cushion.

The casing of the machine is preferably made with a top-plate $m^9$ which is bent more or less in the shape of the udder and is provided either with two long slots $t^2$ for two teats, or with four smaller round holes $t^3$ one for each teat.

A yoke-shaped frame A is applied on the rear part of the cow and by means of a strap B, the frame C of the milking apparatus is suspended from said frame A.

D is the funnel held on the bottom of the frame, E is an outlet tube leading from said funnel to the milk-pail F.

G is an arm attached to the frame C and provided with a handle H for holding it.

J is a sprocket-wheel provided with a crank-handle K and L is a driving-chain for transmitting motion from the sprocket-wheel J to a wheel on the driving axle $a^3$ of the machine.

Having thus described my invention, I claim as new and desire to secure by Letters Patent—

1. In a cow-milking apparatus, the combination with a frame, of two pairs of rocking and reciprocating pads for pressing the teats, of connecting bars holding the corresponding pads of the two pairs parallel during their movements and mechanism for moving the pads of one pair toward each other, while the pads of the other pair are being moved from each other, substantially as set forth.

2. In a cow-milking apparatus, the combination with a frame, of reciprocating and rocking milking pads, mechanism for operating said pads and mechanism for separating the pads to introduce the teats between the pads, substantially as set forth.

In testimony that I claim the foregoing as my invention I have signed my name in presence of two subscribing witnesses.

JENS NIELSEN.

Witnesses:
H. FUERTEN,
ROBERT HANSEN.